United States Patent
Matsimanis et al.

(10) Patent No.: US 10,169,671 B2
(45) Date of Patent: Jan. 1, 2019

(54) FACE DETECTION WITH TEMPERATURE AND DISTANCE VALIDATION

(71) Applicant: MOTOROLA MOBILITY LLC, Chicago, IL (US)

(72) Inventors: Peter A. Matsimanis, Glenview, IL (US); Andrea Manavella, Chicago, IL (US); Cesare Mercurio, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 65 days.

(21) Appl. No.: 15/435,503

(22) Filed: Feb. 17, 2017

(65) Prior Publication Data

US 2018/0239977 A1   Aug. 23, 2018

(51) Int. Cl.
G06K 9/00 (2006.01)
H04N 5/232 (2006.01)
G06K 9/52 (2006.01)

(52) U.S. Cl.
CPC ..... *G06K 9/00899* (2013.01); *G06K 9/00288* (2013.01); *G06K 9/52* (2013.01); *H04N 5/23212* (2013.01); *H04N 5/23219* (2013.01); G06K 2009/00932 (2013.01)

(58) Field of Classification Search
CPC .. G06K 9/00899; G06K 9/00288; G06K 9/52; H04N 5/23212; H04N 5/23219
See application file for complete search history.

(56) References Cited

U.S. PATENT DOCUMENTS

| | | | | |
|---|---|---|---|---|
| 8,416,303 | B2* | 4/2013 | Gomi | H04N 5/2254 |
| | | | | 250/339.05 |
| 9,886,640 | B1* | 2/2018 | Chen | G06K 9/00906 |
| 10,057,499 | B1 | 8/2018 | Chen et al. | |
| 2002/0136435 | A1* | 9/2002 | Prokoski | G06K 9/00221 |
| | | | | 382/118 |
| 2007/0189583 | A1* | 8/2007 | Shimada | G06K 9/00255 |
| | | | | 382/118 |

(Continued)

OTHER PUBLICATIONS

Hansen, Dan Witzner, et al., "Improving Face Detection with TOF Cameras", Technical University of Denmark, 2007.

(Continued)

*Primary Examiner* — Nicholas G Giles
(74) *Attorney, Agent, or Firm* — Yudell Isidore PLLC

(57) ABSTRACT

An electronic device incorporates features that are dependent on finding a face by image processing of an image taken by an image capturing device. To avoid false positives and false negatives due to poor focus, exposure, or spoofing with a picture, the electronic device validates, by distance and/or temperature, a candidate face within a captured image. Distance information is used to scale the candidate face to an actual size for comparison against biometric data on a range of sizes of a human face. Detected temperature is compared against biometric data on the temperature of a human face sensed in the infrared spectrum. Confidence value for face detection is increased or decreased in relation to the validation by size/temperature. For a validated candidate having a confidence value above a threshold, the electronic device can adjust camera controls of an image capturing device or enable a face recognition security component.

20 Claims, 6 Drawing Sheets

(56) References Cited

U.S. PATENT DOCUMENTS

| | | | |
|---|---|---|---|
| 2008/0094486 A1 | 4/2008 | Fuh et al. | |
| 2010/0128938 A1* | 5/2010 | Chung | G06K 9/00255 382/117 |
| 2010/0134250 A1* | 6/2010 | Chung | G06K 9/00221 340/5.86 |
| 2012/0002082 A1 | 1/2012 | Johnson et al. | |
| 2012/0147139 A1 | 6/2012 | Li et al. | |
| 2013/0235163 A1 | 9/2013 | Joo | |
| 2014/0337930 A1* | 11/2014 | Hoyos | H04L 63/10 726/4 |
| 2015/0092066 A1 | 4/2015 | Geiss et al. | |
| 2016/0227100 A1 | 8/2016 | Liu et al. | |
| 2016/0295097 A1 | 10/2016 | Shanmugavadivelu et al. | |
| 2016/0299349 A1 | 10/2016 | Cho | |
| 2016/0301840 A1 | 10/2016 | Du et al. | |
| 2017/0064184 A1 | 3/2017 | Tsai | |
| 2017/0163902 A1 | 6/2017 | Wu | |
| 2017/0201684 A1 | 7/2017 | Kang et al. | |
| 2017/0277018 A1 | 9/2017 | Dayana et al. | |
| 2017/0324906 A1 | 11/2017 | Kang et al. | |
| 2018/0039845 A1* | 2/2018 | Chen | G06K 9/00906 |
| 2018/0096212 A1* | 4/2018 | Lin | G06K 9/00906 |
| 2018/0139369 A1 | 5/2018 | Chen et al. | |

OTHER PUBLICATIONS

Abidi, Besma, et al., "Recent Advances in Visual and Infrared Face Recognition: A Review", Computer Vision and Image Understanding, Jan. 2005.

Bagheri, Saeid et al., U.S. Appl. No. 15/476,729, filed Mar. 31, 2017, The United States Patent and Trademark Office.

Chen, Yin-Hu et al., U.S. Appl. No. 15/398,532, filed Jan. 4, 2017, The United States Patent and Trademark Office.

Chen, Yin-Hu et al., U.S. Appl. No. 15/353,435, filed Nov. 16, 2016, The United States Patent and Trademark Office.

Chen, Yin-Hu et al., U.S. Appl. No. 15/354,501, filed Nov. 17, 2016, The United States Patent and Trademark Office.

Chen, Yin-Hu, et al., U.S. Appl. No. 15/441,085, filed Feb. 23, 2017, The United States Patent and Trademark Office.

Chen, Yin-Hu, et al., U.S. Appl. No. 15/438,699, filed Feb. 21, 2017, The United States Patent and Trademark Office.

Chen, Yin-Hu, et al., U.S. Appl. No. 15/459,621, filed Mar. 15, 2017, The United States Patent and Trademark Office.

Li, Dalong, et al., U.S. Appl. No. 15/013,232, filed Feb. 2, 2016, The United States Patent and Trademark Office.

Li, Qiaotian, et al., U.S. Appl. No. 15/464,118, filed Mar. 20, 2017, The United States Patent and Trademark Office.

Musatenko, Yuriy, et al., U.S. Appl. No. 15/349,948, filed Nov. 11, 2016, The United States Patent and Trademark Office.

Ho, Tuan V., Non-Final Office Action, U.S. Appl. No. 15/464,118, The United States Patent and Trademark Office, dated Feb. 23, 2018.

Pasiewicz, Daniel M., Non-Final Office Action, U.S. Appl. No. 15/354,501, The United States Patent and Trademark Office, dated Mar. 15, 2018.

Monk, Mark T., Final Office Action, U.S. Appl. No. 15/464,118, The United States Patent and Trademark Office, dated Aug. 21, 2018.

Segura, Cynthia, Non-Final Office Action, U.S. Appl. No. 15/398,532, The United States Patent and Trademark Office, dated Sep. 4, 2018.

* cited by examiner

FACE DETECTION WITH TEMPERATURE AND DISTANCE VALIDATION

BACKGROUND

1. Technical Field

The present disclosure relates generally to user devices that include optical face detection capabilities.

2. Description of the Related Art

User devices such as smart phones and tablet personal computers (PCs) often include a basic face detection capability enabled using a front optical camera. Image processing can generally detect a face within the focal plane if the person is properly illuminated and positioned. Several algorithms in different applications on user devices benefit from the face detection capability. For example, a phone camera and a single lens reflex (SLR) camera use face detection to determine exposure and to focus on a face, if any, that is within view. Failure to correctly detect a face can thus result in improper focus and an incorrect exposure. Thus, the captured image can be too dark and/or overexposed and/or blurred. However, in a significant number of situations, image processing is unreliable. False positives occur when objects are incorrectly deemed to be a face. False negatives occur when a face is not detected. Errors in face detection tend to occur in dark images, backlit images, and very bright images.

BRIEF DESCRIPTION OF THE DRAWINGS

The description of the illustrative embodiments is to be read in conjunction with the accompanying drawings, wherein.

DETAILED DESCRIPTION

Figure 1:
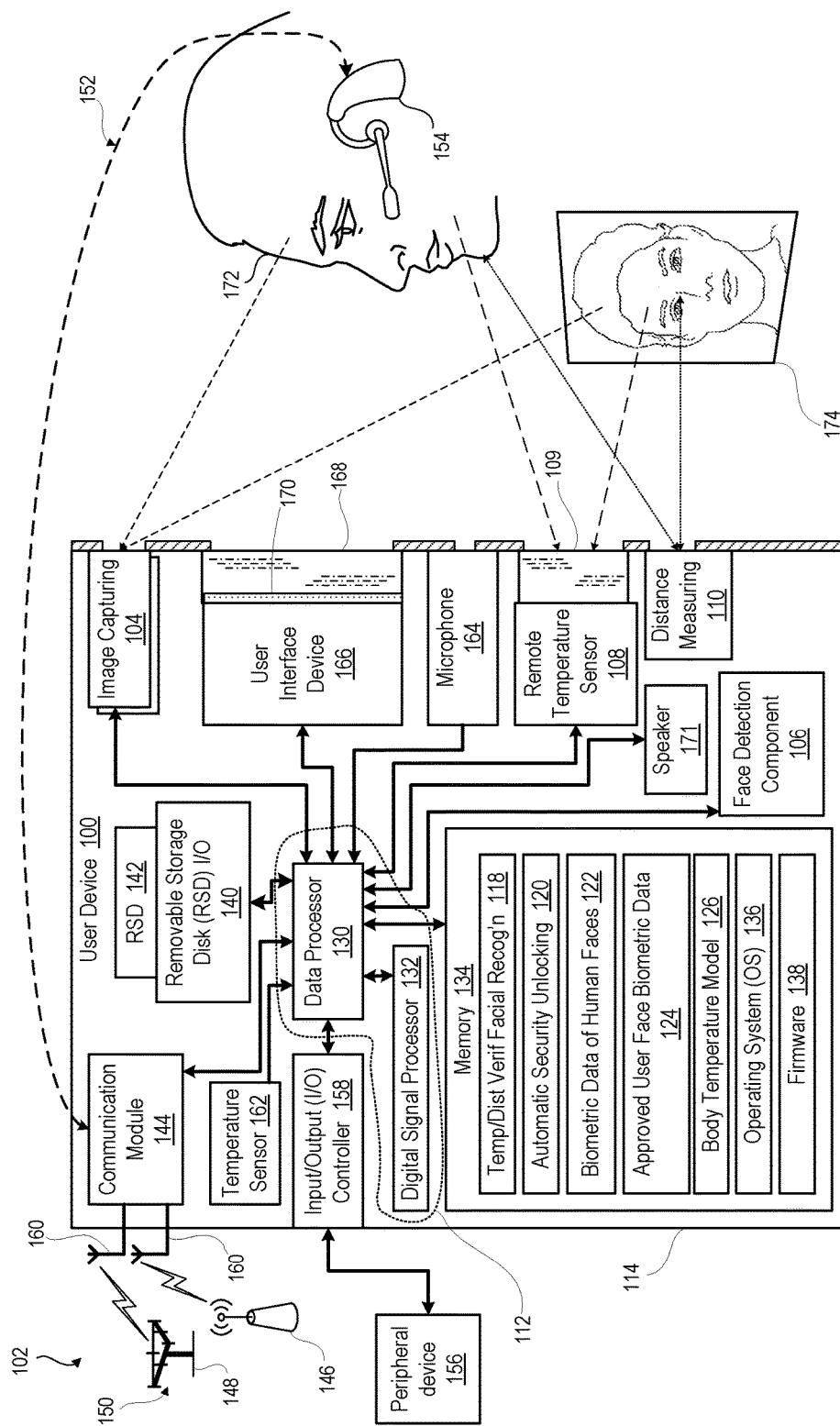
FIG. 1 illustrates a functional block diagram of a user device having a face detection component whose accuracy is augmented by distance measurement and temperature sensing, according to one or more embodiments.

The illustrative embodiments of the present disclosure provide a method and user device that improve face detection in image capture via use one or both of: an infrared (IR) sensed temperature of the human body and distance to the object/body. False negatives and false positives are reduced. In one or more embodiments, a face detection algorithm is included within a computing chipset of a user device. The face detection algorithm can operate when the user device is active, returning a confidence level for each candidate face that is sensed within a field of view of a camera of the user device. The face detection algorithm returns a confidence level for a candidate face that is compared against a confidence threshold. If the confidence threshold is low, then all faces are detected, but the possibility of false positives increase. If the confidence threshold is high, then no false positives are present but some faces could be missed (false negative). False negatives happen due to the wide range in ambient lighting conditions to which the user device can be subjected. False positives can happen in situations where facial recognition is required to unlock certain features of the user device. Such a capability can create an incentive for third parties to attempt to spoof an authorized user with a photo to unlock a misappropriated user device.

According to aspects of the present innovation, if a candidate face is detected by the regular face detect algorithm, then a distance measuring sensor can confirm the presence of an actual face. The distance of the object is used to scale a sensed candidate face for comparison against minimum and maximum face width and height possible for an actual face.

According to aspects of the present innovation, remotely sensed temperature can be used to validate the candidate face using a body temperature model. If a candidate face is not optically detected and the temperature sensor gives a temperature similar to the body temperature model, then the confidence level threshold is increased and the face detect algorithm can be run again. If a sensed temperature is not similar to the body temperature model, then the confidence threshold of the face detect algorithm is lowered. In instances where no object is optically detected in the field of view, according to the distance measuring sensor, the face detection algorithm can be disabled, thereby reducing energy consumption and processing time.

According to aspect of the present innovation, a computer program product includes a computer readable storage device. Program code is stored on the computer readable storage device. When executed by a processor associated with an electronic device, the program code enables the electronic device to provide the functionality of receiving an image captured by an image capturing device of an electronic device and processing the image for characteristics associated with a presence of at least one candidate face with a spatial dimension. The program code provides the functionality of, in response to receiving an initial confidence value indicating the presence of a candidate face having a spatial dimension: detecting at least one of: a distance from the electronic device to the candidate face and a temperature of the candidate face. The program code provides the functionality of determining, based on the at least one of the distance and the temperature of the candidate face and using known biometric characteristics of a human face, whether the candidate face is a validated candidate face. In response to the candidate face being a validated candidate face, the program code provides the functionality of increasing the confidence value assigned to the candidate face to a higher confidence value as a final confidence value. In response to the candidate face not being a validated candidate face, the program code provides the functionality of decreasing the confidence value assigned to the candidate face to a lower confidence value as the final confidence value. The program code provides the functionality of determining whether the final confidence value is above a threshold value. In response to the final confidence value being above the threshold value, the program code provides the functionality of performing at least one action triggered in response to detection of a human face with an above-threshold confidence value, the at least one action selected from among a group comprising at least one of: adjusting camera image controls and enabling a face recognition security component.

The confidence level threshold has to be tuned depending on the face detection engine that is being used. Usually the confidence score is a value in the range 0-1000. The detection of a face is determined when its confidence score is above a certain value, typically above the half of the range. To decrease the false positive detection, a hysteresis approach is considered. Two thresholds determine if the face detected is a true positive or is a false positive. The higher threshold is used to determine the true positive. The lower threshold is used to determine the false positive. By increasing the higher threshold, it is possible to detect more true faces but it also increases the rate of false negative. Faces with a confidence score lesser than this threshold will not be detected as true faces.

If the gap between the two thresholds is high, a methodology can be implemented for how to deal with confidence values that lie between the two thresholds. For example, a confidence value based on the face detection engine alone can be above the higher threshold, indicating a true positive state. Validations based on the temperature and distance sensors can lower the confidence value below the upper threshold. However, once the score is above the higher threshold, the true positive state is kept until the confidence score decreases to be less than the lower threshold. Conversely, a confidence value based on the face detection engine alone can be below the lower threshold, indicating a false positive. Validations based on the temperature and distance sensors can raise the confidence value above the lower threshold. The false positive state is maintained until the validations raise the confidence value to be above the upper threshold. For yet another situation, the face detection engine can initially provide a confidence value that is indeterminate, being between the lower and upper thresholds. The validations based on the temperature and distance sensors can adjust the confidence value to be either above the upper threshold to indicate a true positive state or below the lower threshold to indicate a false positive state.

The validations provided by the temperature and distance sensors enable widening the gap between a lower threshold for false positive state and an upper threshold for a true positive state. The validations thus provide for more accurate determinations of either a false positive or true positive state without a significant number of indeterminate cases. Either threshold can be dynamically changed based on the capability of these additional validations.

In one embodiment, the values used for the confidence scores are: 520 as the lower threshold for both rear and front cameras; 560 as the higher threshold for the front camera; and 625 as the higher threshold for the rear camera. This distinction is due to the different resolution of the two cameras and the result of a tuning procedure developed as part of the present innovation.

Typically, the confidence level of a true face is above 630. A false positive may have a confidence higher than this value. With current technology, these confidence values are computed by weighting the probability that eyes, nose and mouth are detected. According to one aspect of the disclosure, the confidence score to be associated to the detection is utilized simply as an indication of how confident the engine is to determine that the detected face is close to the dataset used for training the model and the engine itself. With the features of the present innovation, either of the cameras can be used in conjunction with validations provided by a distance sensor and a temperature sensor to dynamically change the final confidence score. The validations are used to weight the output of the cameras and to correlate the output to the confidence score coming from any face detection engine.

In the following detailed description of exemplary embodiments of the disclosure, specific exemplary embodiments in which the various aspects of the disclosure may be practiced are described in sufficient detail to enable those skilled in the art to practice the innovation, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Turning now to FIG. 1, there is depicted a block diagram representation of an example electronic device, which for purposes of the description is assumed to be and described as user device 100, within which several of the features of the disclosure can be implemented. It is appreciated that the electronic device does not have to be a user device, in some embodiments. For example, an electronic device can be a security device that allows a person to unlock an entry way or to disable a security system to a facility. In an exemplary aspect, user device 100 includes the hardware and software to support various wireless or wired communication functions as part of a communication system 102. According to the general illustration, user device 100 includes at least one image capturing device 104, such as an optical camera having camera controls to adjust focus and exposure of a viewing area. User device 100 includes a face detection capability, such as a face detection component 106 in communication with image capturing device 104 to perform image processing of an image taken by image capturing device 104. Face detection component 106 provides a confidence value of any candidate face detected in the image. User device 100 can include a remote temperature sensor 108 such as an infrared sensor having a fixed or variable lens 109 that can be focused to a nominal user position from user device 100. User device 100 can include a distance measuring sensor 110 such as time-of-flight laser or lidar. A processor subsystem 112 is in communication with image capturing device 104, infrared sensor 108, and face detection component 106. The functional components of user device 100 can be contained with a unitary housing 114 or formed as part of a distributed architecture. The face detection component 106 can be a dedicated processing integrated circuit component of a chipset of the user device 104. The face detection component 106 can be software module resident in memory and executed by the processor subsystem 112.

Processor subsystem 112 executes applications contained in a memory 116. Examples of these applications include temperature/distance verified facial recognition utility 118 and automatic security unlocking utility 120. Utilities 118, 120 can both access biometric data 122 of human faces, approved user face biometric data 124, and body temperature model 126. The user device 100 can be one of a host of different types of devices, including but not limited to, a mobile cellular phone or smart-phone, a laptop, a net-book, an ultra-book, and/or a tablet computing device. The user device 100 may be portable or fixed.

Referring now to the specific component makeup and the associated functionality of the presented components, processor subsystem 112 can be an integrated circuit (IC) that connects, via a plurality of bus interconnects (illustrated by the bi-directional arrows), to a plurality of functional components of user device 100. Processor subsystem 112 can include one or more programmable microprocessors, such as data processor 130 and digital signal processor (DSP) 132, which may both be integrated into a single processing device, in some embodiments. Processor subsystem 112 controls the communication, user interface, and other functions and/or operations of user device 100. These functions and/or operations thus include, but are not limited to, application data processing and signal processing. The user device 100 may use hardware component equivalents to processor subsystem 112, such as special purpose hardware, dedicated processors, general purpose computers, microprocessor-based computers, micro-controllers, optical computers, analog computers, dedicated processors and/or dedicated hard wired logic. Connected to processor subsystem 112 is memory 134, which can include volatile memory and/or non-volatile memory. Memory 134 stores software, such an operating system 136 and firmware 138. One or more executable applications can be stored within memory 134 for execution by processor subsystem 112. For example, memory 134 is illustrated as containing temperature/distance verified facial recognition utility 118, automatic security unlocking utility 120 and operating system 136. Memory 134 may be augmented by data storage, illustrated as a removable storage device (RSD) input/output (I/O) interface 140 that receives an RSD 142.

User device 100 supports wireless communication via a communication module 144. For example, user device 100 may support communication protocols and transceiver radio frequencies appropriate for a wireless local area network (WLAN), illustrated as node 146, a radio access network (RAN) 148 of a wireless wide area network (WWAN) or cellular network 150, and a near field or personal access network (PAN) 152, illustrated as a BLUETOOTH headset device 154. In certain embodiments, user device 100 may also support a hardwired local access network (LAN) or peripheral devices 156 via an I/O controller 158. User device 100 can communicate via antennas 160 with node 146, RAN 148, and PAN 152.

User device 100 can include an internal temperature sensor 162, which can be used to sense an ambient temperature condition as well as to prevent an over-temperature condition from damaging sensitive components. The sensed ambient temperature can be used to adjust parameters accessed in body temperature model 126, such as lowering an expected human temperature for cold ambient conditions. User device 100 can include other input and output devices. For example, microphone 164 can receive user audible inputs. As another example, user interface device 166 can present visual or tactile outputs as well as receiving user inputs. In one example, user interface device 166 can include a touch screen 168 that covers a display 170. Audio speaker 171 can augment or provide alternate presentation of the visual or tactile outputs of user interface device 166.

Temperature/distance verification facial recognition utility 118 augments capabilities provided by face detection component 106 to accurately detect a human face 172. With convention face detection, face detection component 106 would be limited to a two-dimensional (2D) optical image capability, and the face detection component 106, in conventional applications, could be fooled by a picture 174 of a human face. With the enhancements provide by the present disclosure, distance measuring sensor 110 can confirm that an object is within range of the image capturing device 104. Dimensions within the image of a candidate face can be scaled to actual size based on the distance detected by the distance measuring sensor 110. Remote temperature sensor 108 can also verify whether the candidate face is a human face 172 or something else, such as picture 174. The augmented capability of the face detection component 106 provides increased trust for expanded uses of face detection, such as utilizing face recognition by the automatic security unlocking utility 120.

Figure 2:
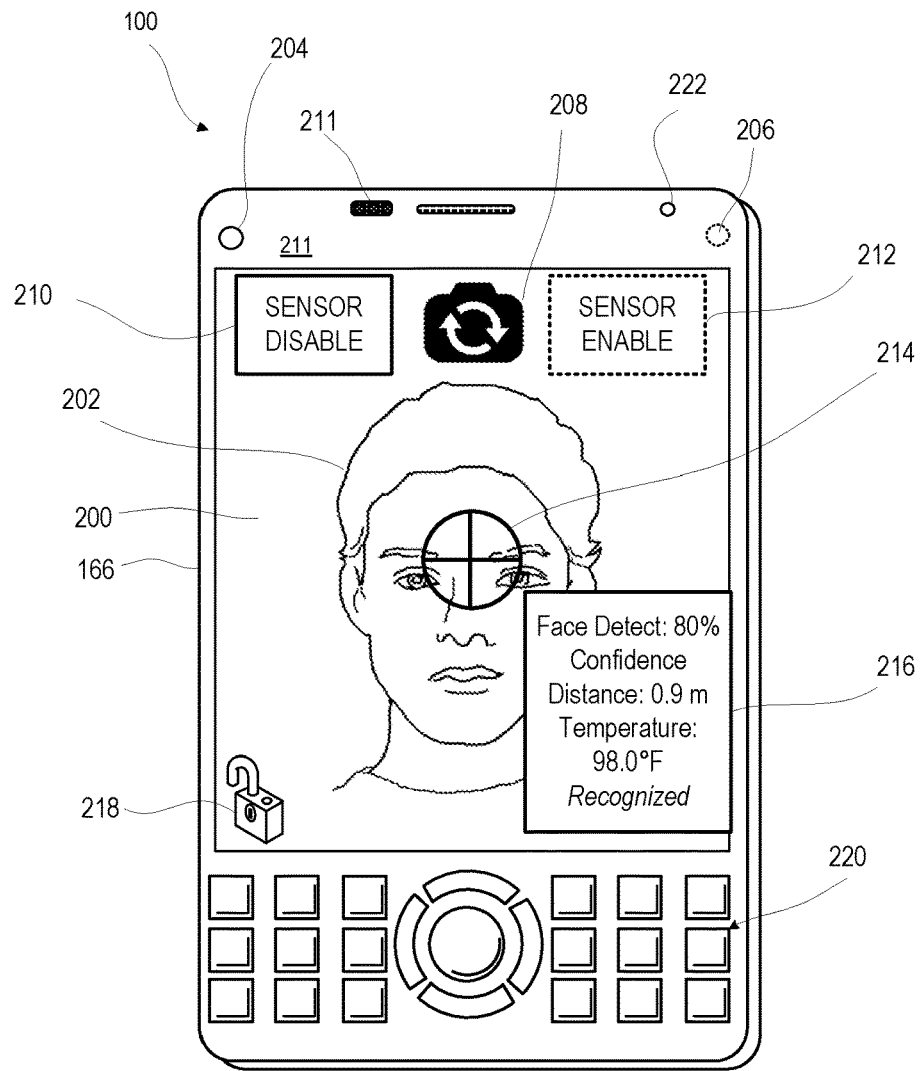
FIG. 2 illustrates a front view of the user device of FIG. 1 that displays a user interface, according to one or more embodiments.

FIG. 2 illustrates that user interface device 166 of user device 100. User interface device 166 can present a user interface (UI) 200 that displays an image 202 taken by either a front side camera 204 or a backside camera 206 (shown in phantom) as selected by an affordance 208. In a temperature indicating mode of UI 200, UI 200 can present one or more affordances, such as an icon 210, that invite a user selection to enable an infrared temperature sensor 211 or an icon 212 to disable the infrared temperature sensor. A graphical indication 214 alerts the user as to where the infrared temperature sensor is directed relative to image 202. Status data 216, such as confidence level in face detection or the measured remote temperature, can be presented on UI 200. UI 200 can also be locked or unlocked based upon augmented facial detection and recognition results as indicated by unlocked status icon 218. The facial detection based on optical image processing is augmented by validating or invalidating a confidence value provided by face detection by at least one of a distance measurement and a temperature measurement. User interface device 166 can utilize other input controls such as buttons 220. A distance measuring sensor, such as lidar 222, can be used to disable temperature monitoring until an object is within range of detection.

Figure 3:
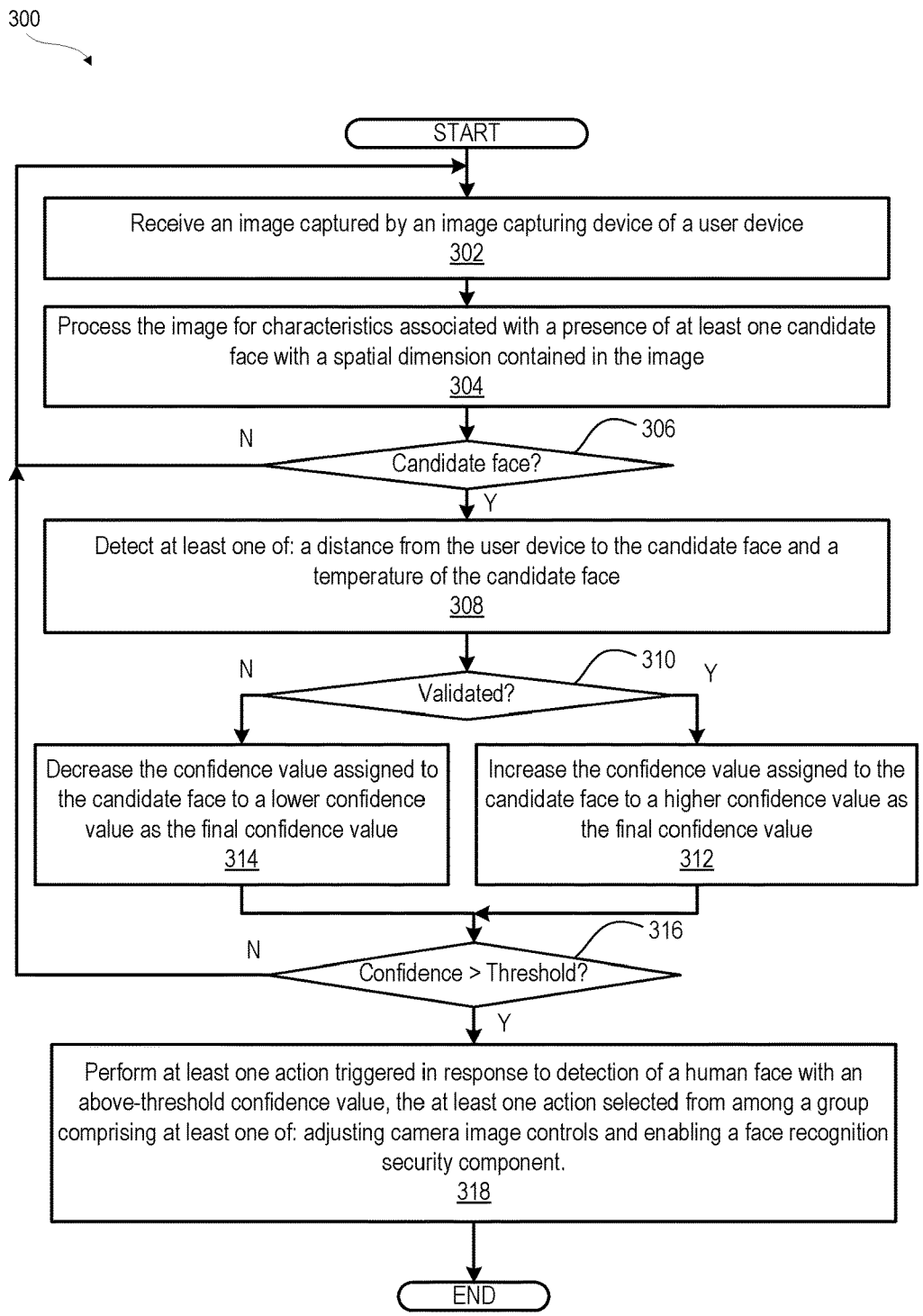
FIG. 3 illustrates a flow diagram of a method of validating an optical face detection capability of the user device to avoid a false determination, according to one or more embodiments.

FIG. 3 illustrates a method 300 for validating an optical face detection feature to avoid a false facial determination. In one or more embodiments, method 300 includes receiving an image captured by an image capturing device of a user device (block 302). Method 300 includes processing the image for characteristics associated with a presence of at least one candidate face with a spatial dimension contained in the image (block 304). Method 300 includes determining whether the processed image contains a candidate face (decision block 306). In response to determining that the processed image does not contain a candidate face in decision block 306, method 300 includes returning to block 302 to monitor for a face candidate. In response to determining that the processed image contains a candidate face in decision block 306, method 300 includes detecting at least one of: a distance from the user device to the candidate face and a temperature of the candidate face (block 308).

Method 300 includes determining whether the candidate face is a validated candidate face, based on the at least one of the distance and the temperature of the candidate face and using known biometric characteristics of a human face (decision block 310). In response to the candidate face being a validated candidate face, method 300 includes increasing the confidence value assigned to the candidate face to a higher confidence value as a final confidence value (block 312). In response to the candidate face not being a validated candidate face, method 300 includes decreasing the confidence value assigned to the candidate face to a lower confidence value as the final confidence value (block 312). After adjusting the confidence value in either block 312 or block 314, method 300 includes determining whether the final confidence value is above a threshold value (decision block 316). The threshold value can be empirically derived by an original equipment manufacturer (OEM) based on a number of test cases. In one or more embodiments, the confidence value can be an analog or binary value, or a range of values, or more than two discrete values. In response to determining in decision block 316 that the final confidence value is not above the threshold value, method 300 includes returning to block 302 to monitor for a face candidate. In response to determining that the final confidence value is above the threshold value, method 300 includes performing at least one action triggered in response to detection of a human face with an above-threshold confidence value (block 318). In one embodiment, the at least one action is selected from among a group comprising at least one of: adjusting camera image controls and enabling a face recognition security component. Then method 300 ends.

Figure 4A:
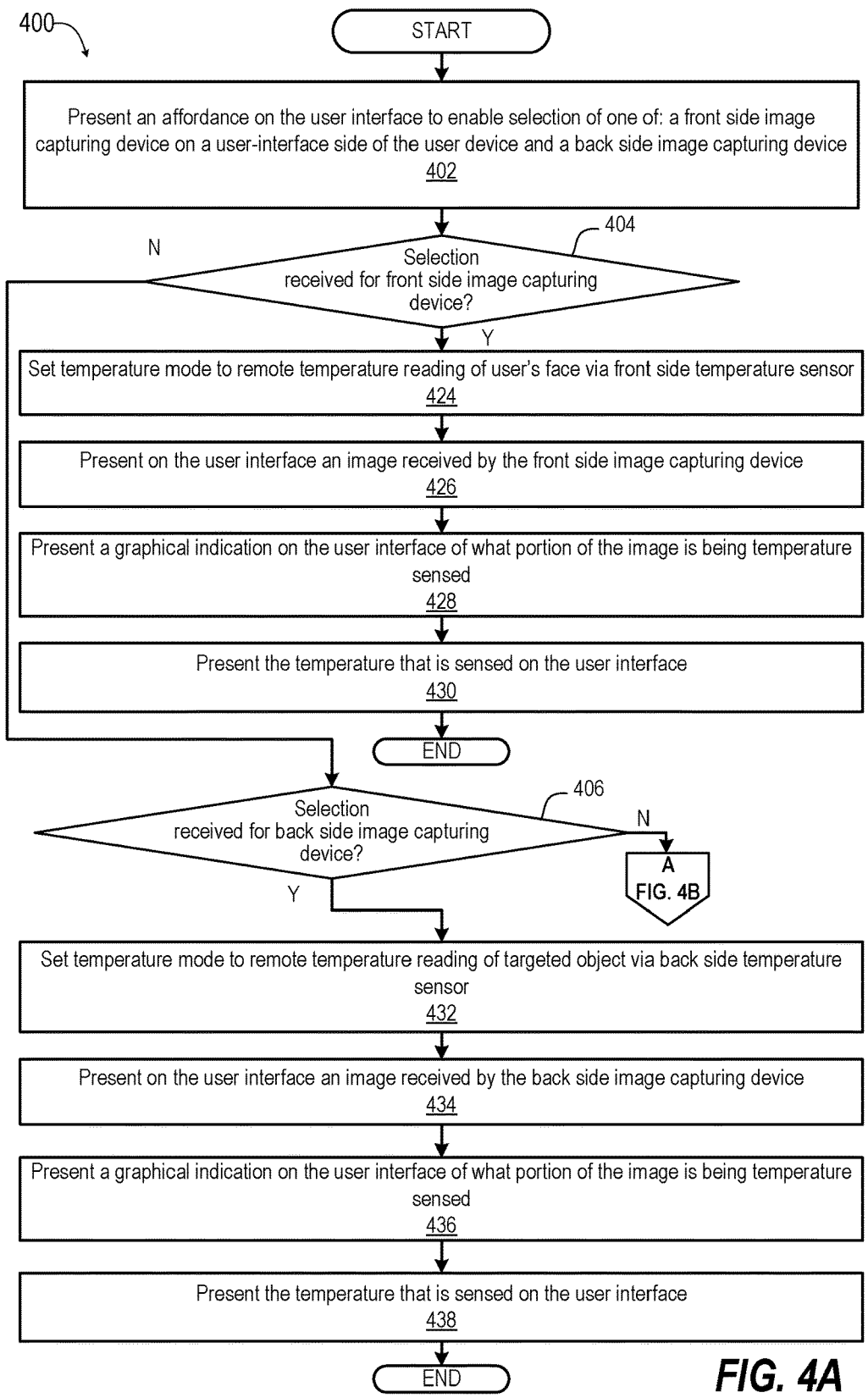
FIGS. 4A-4B illustrate a flow diagram of a method of utilizing a remote temperature sensor incorporated in a user device, according to one or more embodiments.
Figure 4B:
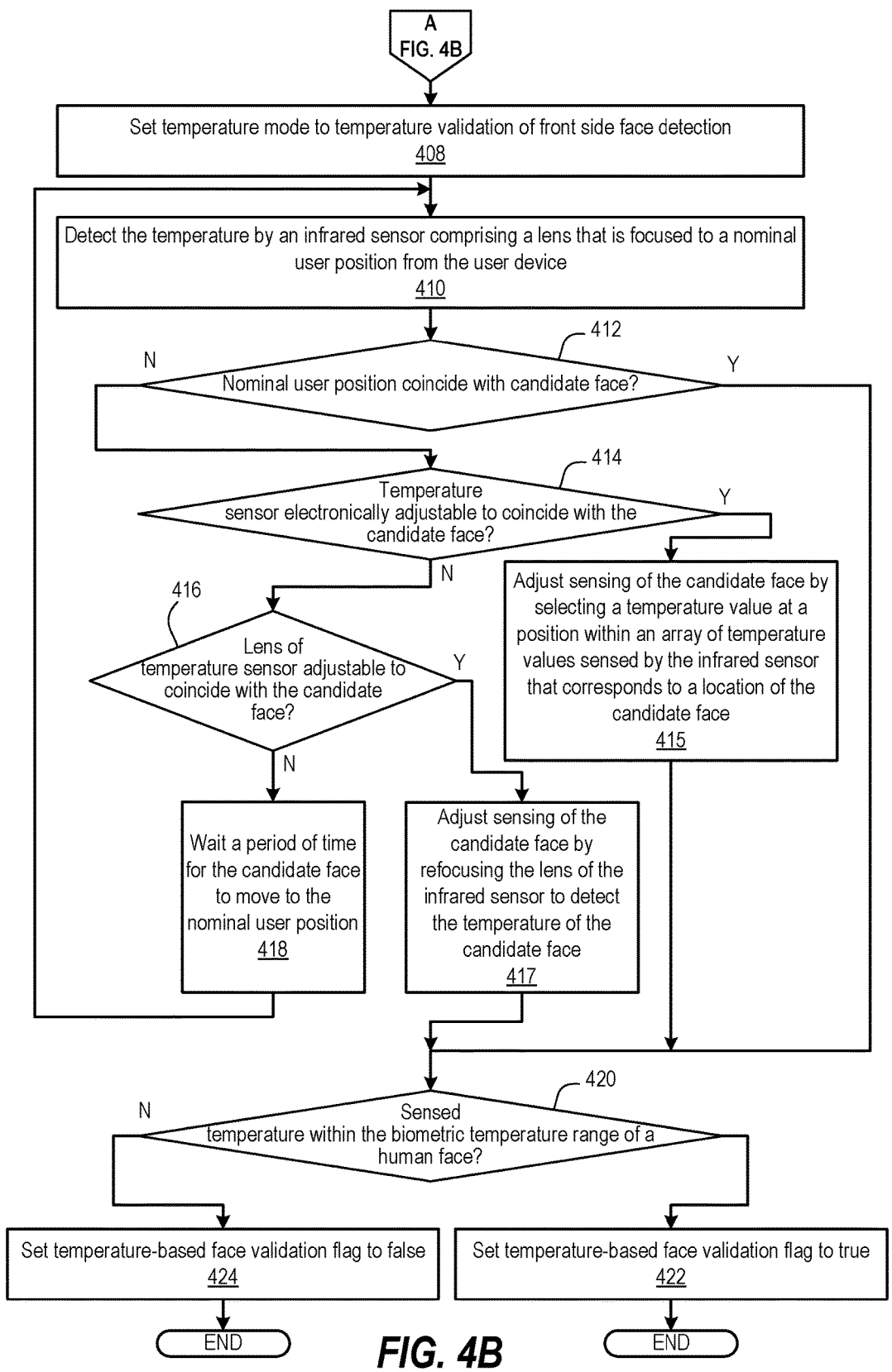

FIGS. 4A-4B illustrate a method of utilizing a remote temperature sensing feature of a user device. Method 400 includes presenting an affordance on the user interface to enable selection of one of: a front side image capturing device on a user-interface side of the user device and a backside image capturing device (block 402). Method 400 includes determining whether a selection is received of the affordance for the front side image capturing device (decision block 404). In response to determining that no selection is received of the affordance for the front side image capturing device in decision block 404, method 400 includes determining whether a selection is received of the affordance for the backside image capturing device (decision block 406).

In response to determining that no selection is received of the affordance for the backside image capturing device in decision block 406, method 400 in one or more exemplary embodiments includes setting temperature mode to temperature validation of front side face detection as a default mode (block 408). In this scenario, the user has not explicitly selected to use the temperature sensing capability. The temperature-based facial validation is implemented then to support on-going facial detection and recognition components. Method 400 includes detecting the temperature by an infrared sensor that includes a lens focused to a nominal user position from the user device (block 410). Method 400 includes determining whether the temperature sensed by the infrared sensor at the nominal user position coincides with a position of a candidate face (decision block 412). In response to determining that the temperature sensed at the nominal user position does not coincide with the position of the candidate face, method 400 includes determining whether the temperature sensor is electronically adjustable to coincide with the candidate face (decision block 414). For example, the temperature sensor can take an infrared image having an array of pixelated temperature values. In response to determining that the temperature sensor is electronically adjustable to coincide with the candidate face in decision block 414, method 400 includes adjusting sensing of the candidate face by selecting a temperature value at a position within an array of temperature values sensed by the infrared sensor that corresponds to a location of the candidate face (block 415). In response to determining that the temperature sensor is not electronically adjustable to coincide with the candidate face in decision block 414, method 400 includes determining whether a lens of the temperature sensor is adjustable to coincide with the candidate face (decision block 416). In response to determining that the lens of the temperature sensor is adjustable to coincide with the candidate face, method 400 includes adjusting sensing of the candidate face by refocusing the lens of the infrared sensor to detect the temperature of the candidate face (block 417). In response to determining that the lens of the temperature sensor is not adjustable to coincide with the candidate face in decision block 416, method 400 includes waiting a period of time for the candidate face to move to the nominal user position (block 418). Then method 400 returns to block 410. In response to determining in decision block 412 that the temperature sensed coincides with the position of the candidate face, method 400 includes determining whether the sensed temperature is within the biometric temperature range of a human face to indicate a validated candidate face (decision block 420). After electronically adjusting the temperature sensor (in block 415) or adjusting the lens of the temperature sensor (block 417), method 400 proceeds to decision block 420. In response to determining whether the sensed temperature is within the biometric temperature range of a human face, method 400 can include setting temperature-based face validation flag to true (block 422). Then method 400 ends. In response to determining that the sensed temperature is not within the biometric temperature range of a human face, method 400 can include setting the temperature-based face validation flag to false (block 424). Then method 400 ends.

In response to determining in decision block 404 that selection is received of the affordance for the front side image capturing device, method 400 includes setting temperature mode to remote temperature reading of user's face via front side temperature sensor (block 424). Method 400 includes presenting on the user interface an image received by the front side image capturing device (block 426). Method 400 includes presenting a graphical indication on the user interface of what portion of the image is being temperature sensed (block 428). Method 400 includes presenting the temperature that is sensed (block 430). Then method 400 ends.

In response to determining that selection is received of the affordance for the backside image capturing device in decision block 406, method 400 includes setting temperature mode to remote temperature reading of a targeted object via backside temperature sensor (block 432). Method 400 includes presenting on the user interface an image received by the backside image capturing device (block 434). Method 400 includes presenting a graphical indication on the user interface of what portion of the image is being temperature sensed (block 436). Method 400 includes presenting the temperature that is sensed (block 438). Then method 400 ends.

Figure 5:
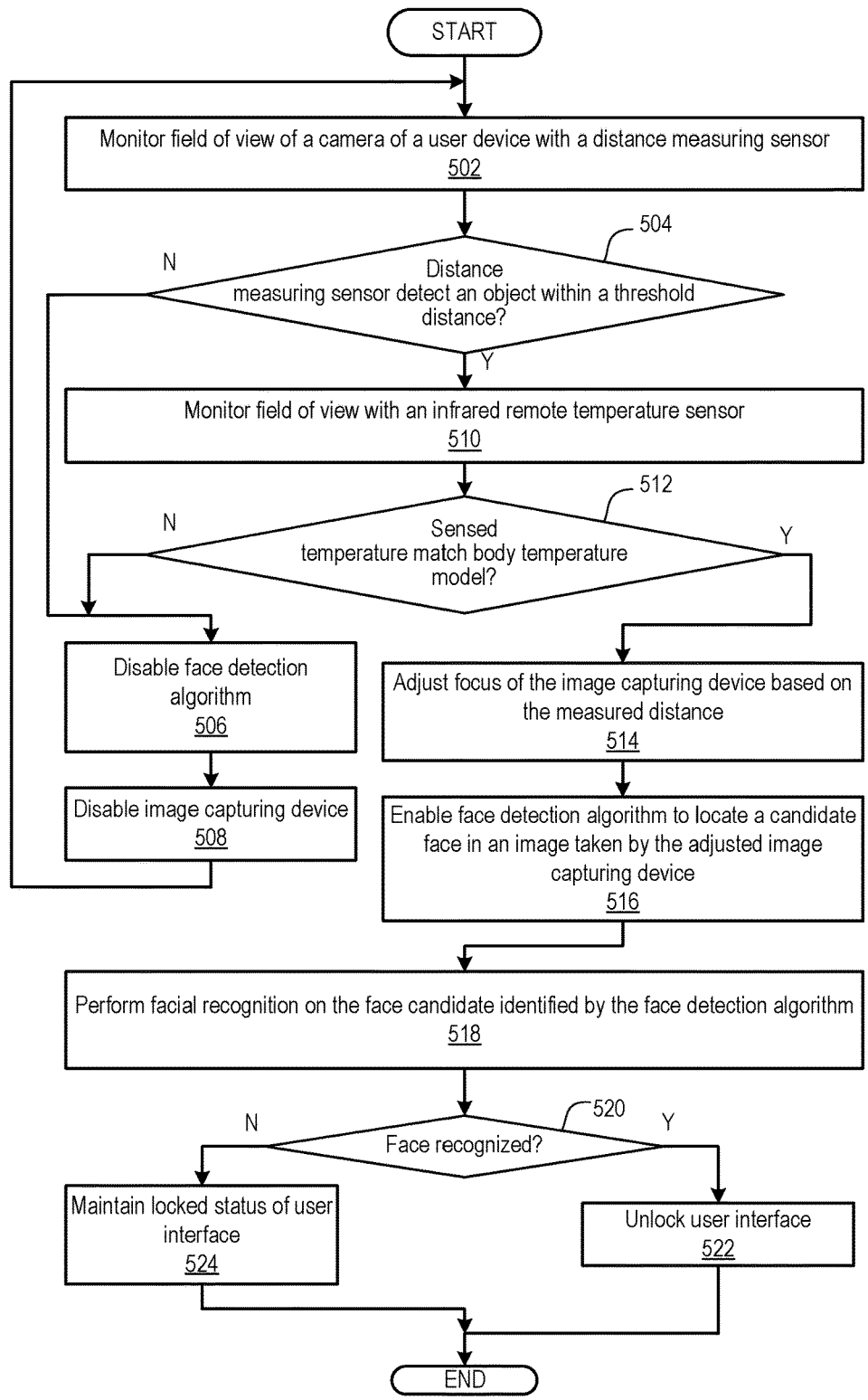
FIG. 5 illustrates a flow diagram of a method of selectively enabling a face detection algorithm of a user device, according to one or more embodiments.

FIG. 5 illustrates a method 500 of preventing a face detection algorithm from operating in instances where no actual face is deemed to be present, thus generally avoiding undue consumption of resources. In some instances, method 500 prevents attempts to bypass a facial recognition security feature with a picture of an authorized user. Method 500 includes monitoring a field of view of a camera of the user device with a distance measuring sensor (block 502). Method includes determining whether the distance measuring sensor detects an object within a threshold distance (decision block 504). In response to determining that the distance measuring sensor does not detect an object within a threshold distance, method 500 includes disabling the face detection algorithm (block 506). Method 500 includes disabling the image capturing device (block 508). This disabling of the image capturing device can be restricted to one or more uses of the user device. For example, the lock out can be in combination with the user device sensing a stationary condition with no verbal inputs from a recognized user. The image capturing device can be activated by other components of the user device even if disabled due to lack of detecting an object within the field of view of the distance measuring device. Then method 500 returns to block 502 to continue monitoring for an object. In response to determining that the distance measuring sensor does detect an object within a threshold distance, method 500 includes monitoring the field of view with an infrared remote temperature sensor (block 510). Method 500 includes determining whether a temperature sensed by the infrared remote temperature sensor matches a body temperature model (decision block 512). In response to determining that the temperature sensed by the infrared remote temperature sensor does not match a body temperature model 126 (FIG. 1), method 500 returns to block 506 at which the face detection algorithm is disabled. In response to determining that the temperature sensed by the infrared remote temperature sensor does match a body temperature model, method 500 includes adjusting the focus of the image capturing device based on the measured distance (block 514). Method 500 includes enabling the face detection algorithm to locate a candidate face in an image taken by the adjusted image capturing device (block 516). Method 500 includes performing facial recognition on the face candidate identified by the face detection algorithm (block 518). Method 500 includes determining whether the face candidate is recognized as belonging to an approved user (decision block 520). In response to determining that the face recognition security component recognizes the candidate face as belonging to an approved user, method 500 includes unlocking a user interface of the user device (block 522). Then method 500 ends. In response to determining that face recognition security component does not recognize the candidate face as belonging to an approved user in decision block 520, method 500 includes maintaining a locked status of the user interface (block 524). Then method 500 ends.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
   receiving an image captured by an image capturing device;
   processing the image for characteristics associated with a presence of at least one candidate face with a spatial dimension; and
   in response to receiving, from the image characteristics, an initial confidence value indicating the presence of a candidate face:
      detecting at least one of (i) a distance from the image capturing device to the candidate face and (ii) a temperature of the candidate face;
      determining, based on the detected at least one of the distance to and the temperature of the candidate face and using known biometric characteristics of a human face, whether the candidate face is a validated candidate face;
      in response to determining that the candidate face is a validated candidate face, increasing a confidence value assigned to the candidate face to a higher confidence value assigned as a final confidence value;
      in response to determining that the candidate face is not a validated candidate face, decreasing the confidence value assigned to the candidate face to a lower confidence value assigned as the final confidence value;
      determining whether the final confidence value is above a threshold value; and
      in response to the final confidence value being above the threshold value, performing at least one action selected from among a group comprising at least one of (i) adjusting camera image controls and (ii) enabling a face recognition security component.

2. The method of claim 1, further comprising:
   determining whether the image contains the candidate face with insufficient exposure or focus for processing by the face recognition security component of the image capturing device; and
   in response to the candidate face not having sufficient exposure or focus for processing by the face recognition security component:
      autonomously adjusting at least one of an exposure and a focus of image controls of the image capturing device to enhance image capture of the candidate face;
      receiving an enhanced image of the candidate face; and
      providing the enhanced image of the candidate face to the face recognition security component.

3. The method of claim 2, further comprising:
   in response to the face recognition security component recognizing the candidate face as belonging to an approved user, unlocking a user interface of the image capturing device; and
   in response to the face recognition security component not recognizing the candidate face as belonging to an approved user while the user interface is unlocked, locking the user interface of the image capturing device.

4. The method of claim 1, wherein:
   detecting at least one of: a distance from the image capturing device to the candidate face; and a temperature of the candidate face comprises detecting both: the distance from the image capturing device to the candidate face; and the temperature of the candidate face; and
   determining whether the candidate face is a validated candidate face comprises:
      determining whether the spatial dimension of the candidate face at the detected distance is within a biometric size range of a human face to indicate a size validated candidate face; and
      determining whether the detected temperature is within a biometric temperature range of a human face to indicate a temperature validated candidate face; and
   the method further comprises:
      in response to a failure to validate either of: the size and the temperature of the candidate face, decreasing the confidence value assigned to the candidate face to or below the lower confidence value; and
      in response to validation of both: the size and the temperature of the candidate face, increasing the confidence value assigned to the candidate face to at least the higher confidence value.

5. The method of claim 1, further comprising:
   detecting the temperature of the candidate face, the temperature sensed by an infrared sensor comprising a lens that is focused to a nominal user position from the image capturing device;
   determining whether a position of the temperature of the candidate face sensed by the infrared sensor is at the nominal user position that coincides with a location of the candidate face;
   in response to determining that the position coincides with the location of the candidate face, determining whether the sensed temperature is within the biometric temperature range of a human face to indicate the validated candidate face; and
   in response to determining that the temperature sensed does not coincide with the position of the candidate face, obtaining a temperature within the candidate face by one of: waiting for the candidate face to move to the nominal user position, refocusing the lens of the infrared sensor to detect the temperature of the candidate face, and selecting a temperature value at a position within an array of temperature values sensed by the infrared sensor that corresponds to a location of the candidate face.

6. The method of claim 1, further comprising:
detecting the temperature by an infrared sensor comprising a lens that is focused to a nominal user position from the image capturing device; and
displaying, on a user interface of the image capturing device, an indication of the nominal user position and the detected temperature.

7. The method of claim 6, further comprising:
presenting an affordance on the user interface to enable selection of one of: a front side image capturing device on a user-interface side of the image capturing device and a backside image capturing device;
in response, at least in part, to detecting user selection of the front side image capturing device, displaying the detected temperature of the candidate face; and
in response to detecting user selection of the backside image capturing device, displaying a detected temperature sensed from an object in a field of view of the backside image capturing device.

8. The method of claim 1, further comprising:
receiving the spatial dimension comprising an image width and an image height of the candidate face;
determining an actual width and an actual height of the candidate face respectively based on the image width and image height of the spatial dimension at the detected distance; and
determining whether the actual width and the actual height are both within a biometric size range of a human face to indicate the validated candidate face.

9. The method of claim 1, wherein:
increasing the confidence value comprises setting a flag for face detection to true;
decreasing the confidence value comprises setting the flag for face detection to false; and
determining whether the confidence value exceeds the threshold value comprises determining whether the flag is set to true.

10. The method of claim 1, wherein, in response to not receiving the initial confidence value indicating the presence of a candidate face having a spatial dimension, disabling a sensor that detects one of: the distance from the image capturing device to the candidate face and the temperature of the candidate face.

11. An electronic device, comprising:
an image capturing device having camera controls to adjust focus and exposure of a viewing area;
a memory having stored thereon a face detection module which performs image processing of an image taken by the image capturing device and provides a confidence value and spatial dimension of each candidate face detected in the image;
at least one sensor from among a group comprising a distance-measuring sensor and an infrared sensor, the at least one sensor oriented to detect a corresponding one of a distance to or a temperature of a candidate face detected by the image capturing device; and
a processor in communication with the image capturing device, the at least one sensor, and the memory, and which executes the face detection module, wherein the processor:
receives an image captured by the image capturing device for image processing, by execution of the face detection module, for any candidate face contained in the image; and
in response to receiving a confidence value of the candidate face having a determined spatial dimension received from execution of the face detection module:
receives from the at least one sensor at least one of the distance from the electronic device to the candidate face and the temperature of the candidate face;
in response to receiving the distance to the candidate face, determines whether the spatial dimension of the candidate face at the distance is within a biometric size range of a human face to indicate a validated candidate face;
in response to receiving the temperature of the candidate face, determines whether the temperature is within a biometric temperature range of a human face to indicate a validated candidate face;
in response to determining that the candidate face is a validated candidate face, increases a confidence value assigned to the candidate face to a first adjusted confidence value;
in response to determining that the candidate face is not a validated candidate face, decreases the confidence value assigned to the candidate face to a second adjusted confidence value;
determines whether a resulting one of the first or second adjusted confidence value exceeds a threshold value; and
in response to the resulting one of the first or second adjusted confidence value being above the threshold value, performs a face dependent action comprising a selected at least one of adjusting camera image controls and enabling a face recognition security component.

12. The electronic device of claim 11, wherein:
the at least one infrared sensor comprises an infrared sensor having a lens that is focused to a nominal user position from the electronic device; and
the processor, in response to the resulting, first or second adjusted confidence value being above the threshold value, performs a face dependent action comprising adjusting camera image controls to obtain an enhanced image of the candidate face.

13. The electronic device of claim 12, further comprising:
the distance-measuring sensor, communicatively coupled to the processor, and oriented to detect a distance to an object within at least a portion of the viewing area of the image capturing device, wherein distance-measuring sensor detects a distance from the electronic device to the candidate face and forwards the detected distance to the processor;
wherein the processor:
determines whether the spatial dimension of the candidate face at the detected distance is within the biometric size range of a human face to indicate a size validated candidate face;
determines whether the detected temperature is within the biometric temperature range of a human face to indicate a temperature validated candidate face;
in response to a failure to validate either of the size and the temperature of the candidate face, decreases the confidence value assigned to the candidate face to or below a lower confidence value; and
in response to validation of both the size and the temperature of the candidate face, increases the confidence value assigned to the candidate face to at least a higher confidence value.

14. The electronic device of claim 12, wherein the processor:
  determines whether a position of and object having the temperature, which is sensed by the infrared sensor at the nominal user position, coincides with a position of the candidate face based upon image processing;
  in response to determining that the temperature sensed coincides with the position of the candidate face, determines whether the sensed temperature is within the biometric temperature range of a human face to indicate the validated candidate face; and
  in response to determining that the temperature sensed does not coincide with the position of the candidate face, obtains a temperature within the candidate face by waiting for the candidate face to move to the nominal user position.

15. The electronic device of claim 12, wherein the processor:
  determines whether a position of an object having the temperature, which is sensed by the infrared sensor at the nominal user position coincides with a position of the candidate face based upon image processing;
  in response to determining that the position of an object having the sensed temperature coincides with the position of the candidate face, determines whether the sensed temperature is within the biometric temperature range of a human face to indicate the validated candidate face; and
  in response to determining that the position of an object having the sensed temperature does not coincide with the position of the candidate face, obtains a temperature within the candidate face by refocusing the lens of the infrared sensor to detect the temperature of the candidate face.

16. The electronic device of claim 12, wherein the processor:
  determines whether a position of an object having the temperature, which is sensed by the infrared sensor at the nominal user position, coincides with a position of the candidate face based upon image processing;
  in response to determining that the position of an object having the sensed temperature coincides with the position of the candidate face, determines whether the sensed temperature is within the biometric temperature range of a human face to indicate the validated candidate face; and
  in response to determining that the position of an object having the sensed temperature does not coincide with the position of the candidate face, obtains a temperature within the candidate face by selecting a temperature value at a position within an array of temperature values sensed by the infrared sensor that corresponds to a location of the candidate face.

17. A non-transitory computer program product comprising:
  a computer readable storage device; and
  program code on the computer readable storage device that when executed by a processor associated with an electronic device enables the electronic device to provide the functionality of:
    receiving an image captured by an image capturing device;
    processing the image for characteristics associated with a presence of at least one candidate face with a spatial dimension; and
    in response to receiving an initial confidence value indicating a presence of a candidate face having a spatial dimension:
      triggering a detection of at least one of: a distance from the image capturing device to the candidate face and a temperature of the candidate face;
      determining, based on the at least one of the distance and the temperature of the candidate face and using known biometric characteristics of a human face, whether the candidate face is a validated candidate face;
      in response to the candidate face being a validated candidate face, increasing an initial confidence value assigned to the candidate face to a higher confidence value assigned as a final confidence value;
      in response to the candidate face not being a validated candidate face, decreasing the confidence value assigned to the candidate face to a lower confidence value assigned as the final confidence value;
      determining whether the final confidence value is above a threshold value; and
      in response to the final confidence value being above the threshold value, performing at least one action triggered in response to detection of the human face with an above-threshold confidence value, the at least one action selected from among a group comprising at least one of adjusting camera image controls and enabling a face recognition security component.

18. The computer program product of claim 17, wherein the program code enables the electronic device to provide the functionality of:
  determining whether the image captured by the image capturing device contains the candidate face having insufficient exposure or focus for processing by the face recognition security component of the electronic device; and
  in response to the candidate face not having sufficient exposure or focus for processing by the face recognition security component:
    adjusting at least one of an exposure and a focus of image capturing device image controls to enhance image capture of the candidate face;
    receiving an enhanced image of the candidate face; and
    providing the enhanced image of the candidate face to the face recognition security component.

19. The computer program product of claim 18, wherein the program code enables the electronic device to provide the functionality of:
  in response to the face recognition security component recognizing the candidate face as belonging to an approved user, unlocking a user interface of the electronic device; and
  in response to the face recognition security component not recognizing the candidate face as belonging to an approved user while the user interface is unlocked, locking the user interface of the electronic device.

20. The computer program product of claim 17, wherein the program code enables the electronic device to provide the functionality of:
  detecting both the distance from the electronic device to the candidate face and the temperature of the candidate face;

determining whether the spatial dimension of the candidate face at the detected distance is within a biometric size range of a human face to indicate a size validated candidate face;

determining whether the detected temperature is within a biometric temperature range of a human face to indicate a temperature validated candidate face;

in response to a failure to validate either of the size and the temperature of the candidate face, decreasing the confidence value assigned to the candidate face to or below the lower confidence value; and in response to validation of both the size and the temperature of the candidate face, increasing the confidence value assigned to the candidate face to at least the higher confidence value.

* * * * *